United States Patent
McArdle et al.

(10) Patent No.: US 7,587,759 B1
(45) Date of Patent: Sep. 8, 2009

(54) INTRUSION PREVENTION FOR ACTIVE NETWORKED APPLICATIONS

(75) Inventors: Mark J. McArdle, Conestogo (CA); Brent A. Johnston, Kitchener (CA)

(73) Assignee: McAfee, Inc., Santa Clara, CA (US)

( * ) Notice: Subject to any disclaimer, the term of this patent is extended or adjusted under 35 U.S.C. 154(b) by 1770 days.

(21) Appl. No.: 10/068,280

(22) Filed: Feb. 4, 2002

(51) Int. Cl.
*H04L 9/00* (2006.01)

(52) U.S. Cl. ............................. 726/22; 726/3; 709/223; 709/229

(58) Field of Classification Search ......... 713/151–154, 713/200–201, 194; 709/318, 200, 202, 201, 709/217, 221–225, 229; 711/216; 382/124; 726/1–6, 13–14, 22–27, 18
See application file for complete search history.

(56) References Cited

U.S. PATENT DOCUMENTS

| | | | | |
|---|---|---|---|---|
| 5,864,683 A | * | 1/1999 | Boebert et al. ............... | 709/249 |
| 5,987,611 A | * | 11/1999 | Freund ........................... | 726/4 |
| 5,991,881 A | * | 11/1999 | Conklin et al. ............... | 713/201 |
| 6,012,152 A | * | 1/2000 | Douik et al. ................... | 714/26 |
| 6,148,336 A | * | 11/2000 | Thomas et al. ............... | 709/224 |
| 6,161,123 A | * | 12/2000 | Renouard et al. ........... | 709/203 |
| 6,226,372 B1 | * | 5/2001 | Beebe et al. ................. | 379/189 |
| 6,269,396 B1 | * | 7/2001 | Shah et al. ................... | 709/223 |
| 6,321,263 B1 | * | 11/2001 | Luzzi et al. .................. | 709/224 |
| 6,519,647 B1 | * | 2/2003 | Howard et al. ............... | 709/229 |
| 6,611,869 B1 | * | 8/2003 | Eschelbeck et al. ......... | 709/228 |
| 6,647,400 B1 | * | 11/2003 | Moran ........................ | 707/205 |
| 6,671,829 B2 | * | 12/2003 | Kaler et al. ................... | 714/39 |
| 6,912,578 B1 | * | 6/2005 | Hanko et al. ................. | 709/227 |
| 7,076,736 B2 | * | 7/2006 | Hugh .......................... | 715/743 |
| 7,299,277 B1 | * | 11/2007 | Moran et al. ................. | 709/224 |

* cited by examiner

*Primary Examiner*—Kimyen Vu
*Assistant Examiner*—Leynna T Truvan
(74) *Attorney, Agent, or Firm*—Zilka-Kotab, PC

(57) ABSTRACT

Intrusion prevention for a computer is based on intrusion rules corresponding to active networked applications executing on the computer. The intrusion rules are a subset of a full ruleset that may include signatures of known attacks or heuristic rules. The subset changes as network connections for active applications are initiated and terminated, or as the active applications terminate.

47 Claims, 4 Drawing Sheets

INTRUSION PREVENTION FOR ACTIVE NETWORKED APPLICATIONS

FIELD OF THE INVENTION

This invention relates generally to computer security, and more particularly to intrusion prevention.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Networks Associates Technology, Inc., All Rights Reserved.

BACKGROUND OF THE INVENTION

Threats to networked computers from hostile network traffic are becoming more and more serious. Compounding the problem is the increase in known vulnerabilities to widely used network applications. Particular attacks, such as Code Red and Nimda, exploit application vulnerabilities and hostile network traffic to compromise and damage systems. Existing technologies that perform both network-based and host-based intrusion detection or intrusion prevention on a computer or workstation examine all network traffic for all known attacks they have been configured to detect. However, because networks are getting faster, and the number of attacks to detect is constantly growing, the processing required by current intrusion detectors is increasing in two dimensions. Eventually, all other processes may be denied the use of the computer since all the processing resources will be consumed by the intrusion detection or intrusion prevention system.

SUMMARY OF THE INVENTION

Intrusion prevention for a computer is based on intrusion rules corresponding to active networked applications executing on the computer. The intrusion rules are a subset of a full ruleset that may include signatures of known attacks or heuristic rules. The subset changes as network connections for active applications are initiated and terminated, or as the active applications terminate.

The present invention describes systems, methods, and computer-readable media of varying scope. In addition to the aspects of the present invention described in this summary, further aspects will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
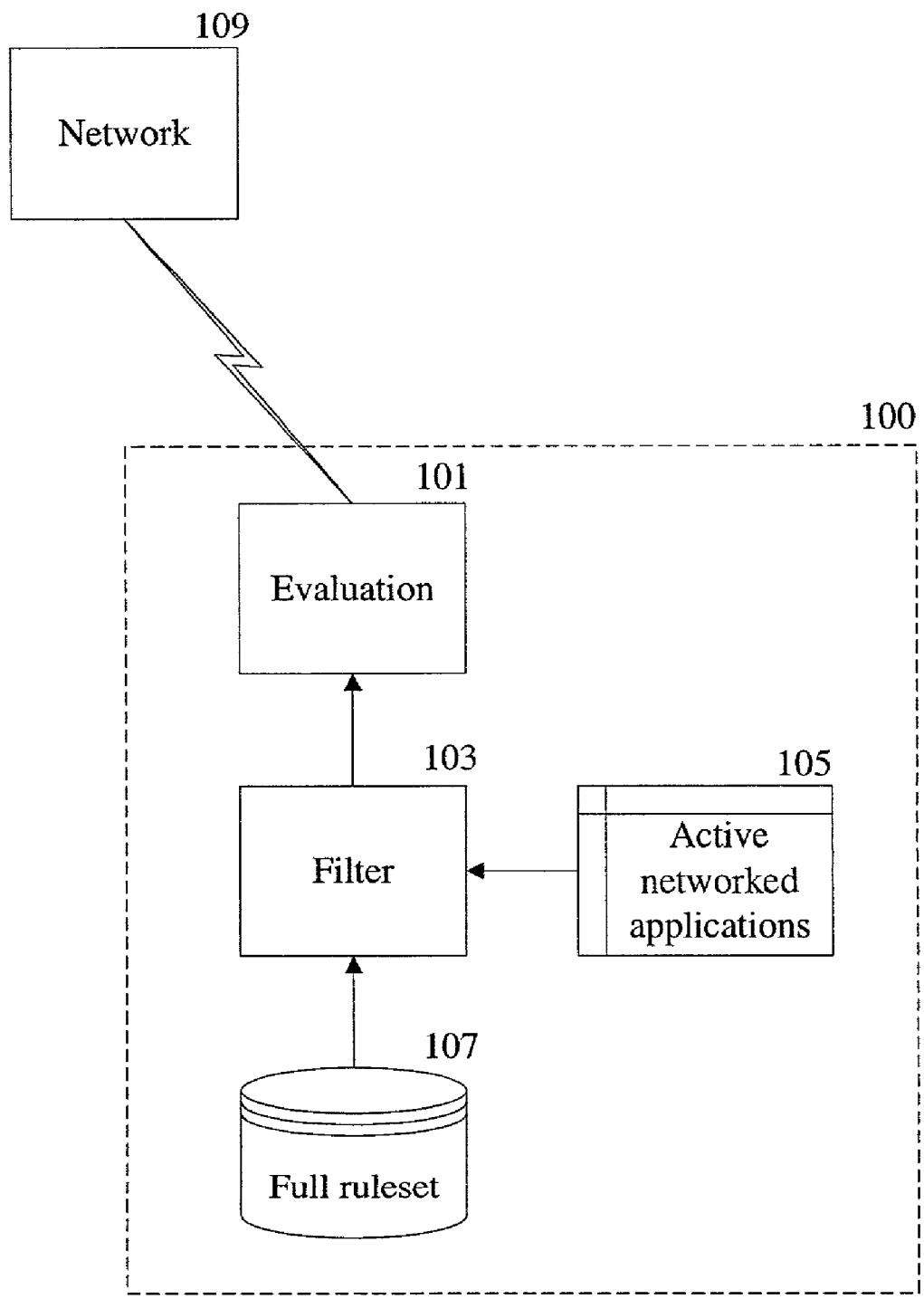
FIG. 1 is a diagram illustrating a system-level overview of an embodiment of the invention.

An overview of the operation of an embodiment of the invention is described by reference to FIG. 1 in which an intrusion prevention system 100 executes on a computer to detect hostile traffic transmitted between a network 109 and applications active on the computer. Intrusion prevention typically relies on pattern matching network traffic against known attack "signatures." For example, the header of a TCP/IP packet may be malformed to exploit a known limitation in the operating system. An intrusion rule may also describe an attack that takes place at a higher level on the protocol stack. For example, an attack that is based on a malformed (or extremely large) HTTP request. The attack signature is stored in a intrusion rule which may contain other information about the attack, such as what application it targets, the signature of the specific hostile payload, and/or what network ports and protocol it uses. An intrusion rule also may be a heuristic rule that cannot be defined by specific characteristics. For example, a heuristic rule may describe an attack that is based on unusual behavior, e.g., an application suddenly making a new, previously unseen connection, or suddenly initiating a larger number of connections. Standard sets of intrusion rules ("rulesets") are commonly available from vendors of intrusion detection/intrusion prevention systems and may be modified to be specific to the computer. Alternatively, some or all of the intrusion rules can be created by an administrator or user of the computer.

The system 100 applies a filter 103 based on the active networked applications 105 to a full ruleset 107 so only those intrusion rules corresponding to the active networked applications are used to evaluate 101 incoming and outgoing network traffic. If incoming or outgoing network traffic matches a rule in the filtered ruleset, the intrusion prevention system 100 discards the hostile traffic and reports the intrusion attempt. In one embodiment, the system 100 reports the attempt by logging the incident and/or triggering an alert. When the filtered ruleset includes the particular network ports used by the attacks, the system 100 evaluates only network traffic through the specified network ports. For intrusion rules that define attacks on connectionless protocols (i.e. ICMP), the network traffic at the appropriate protocol level is analyzed.

In one embodiment, the filter 103 marks the appropriate entries in the full ruleset 107. In an alternate embodiment not shown, the filter 103 extracts the appropriate intrusion rules into an optimized ruleset, which is used to evaluate subsequent network traffic. Such an optimized ruleset could be generated by querying a database for intrusion rules pertaining to only the current active applications. The result of such a query would return a database "view" or "snapshot" which in turn would be used as the "current" ruleset.

It will be appreciated that the set of active networked applications 105 changes as application connections to the network 109 are initiated or terminated. In one embodiment, the system 100 determines when an active application initiates a network connection by intercepting "listen" commands directed to the operating system. The system 100 also monitors for inbound connections to an active, but not currently networked application. A list of active applications may be obtained using various operating system services. An application is removed from the set of active networked applications 105 when it becomes inactive, i.e., the application, or its last network connection, has terminated.

The intrusion prevention system 100 may operate as a stand-alone security system or may operate as part of, or in conjunction with, an existing security system, such as a software firewall. The system 100 may perform analysis for specific protocols, including analysis of specific protocol-level payloads. In an alternate embodiment, the system 100 does not attempt to evaluate application data within the network traffic, deferring the detection of hostile code, such as email viruses, to other security applications.

Because the intrusion rules for applications not currently active, or active applications not currently connected to the network 109, are ignored, the intrusion prevention system 100 requires, on average, less processing resources than intrusion detection/intrusion prevention systems that evaluate network traffic for all known attacks.

Figure 2:
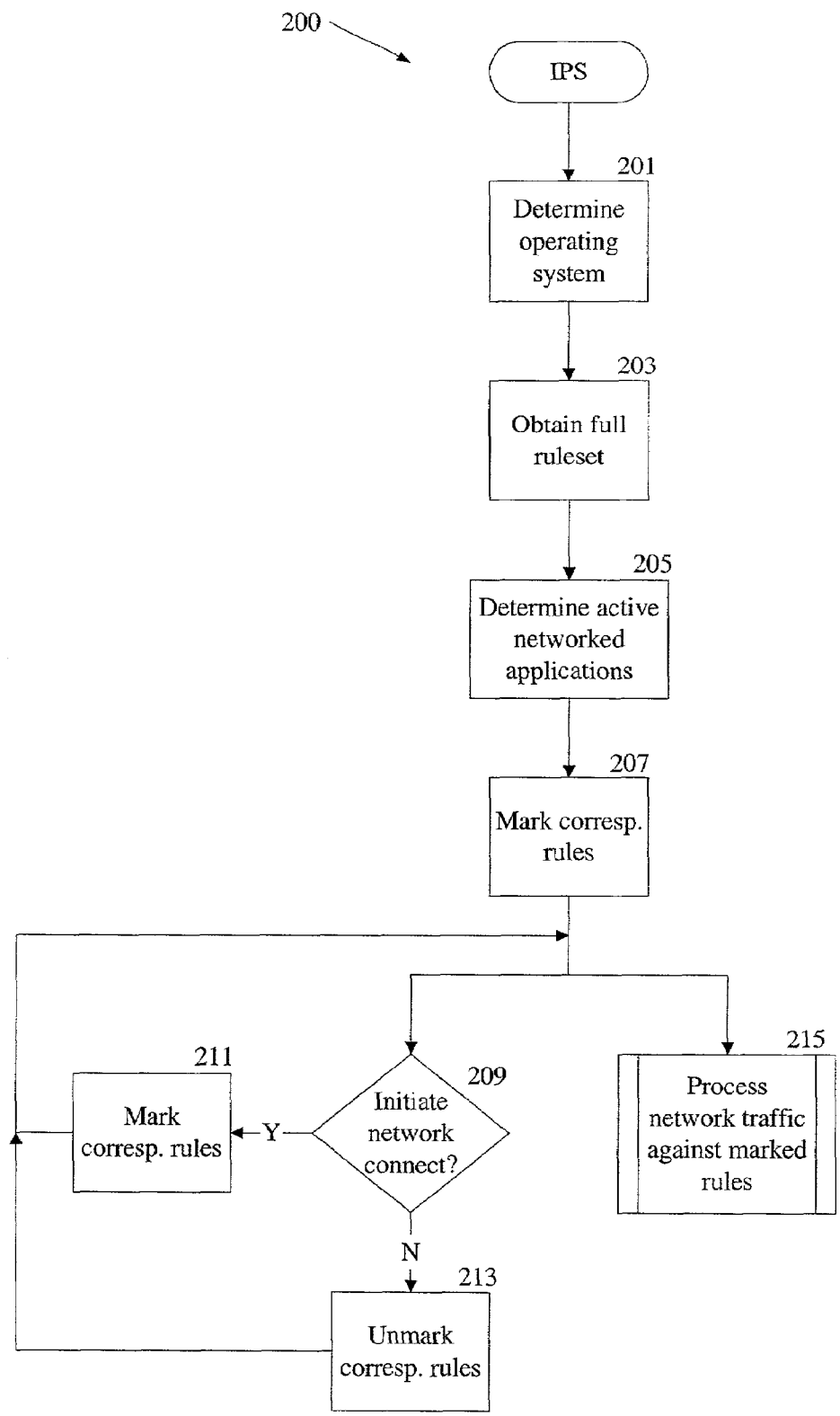
FIG. 2 is a flowchart of a method to be performed by a computer according to an embodiment of the invention.

Next, a method to be performed by a computer in accordance with one embodiment of the invention is described in terms of computer software with reference to a flowchart shown in FIG. 2. The method constitutes computer programs made up of computer-executable instructions. Describing the method by reference to a flowchart enables one skilled in the art to develop such programs including such instructions to carry out the methods on suitably configured computers (the processor of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that the acts described in conjunction with FIG. 2 are not required to be performed in the particular order shown and that the processes of the invention may be divided into more or fewer logical blocks than those shown.

An intrusion prevention system (IPS) method 200 shown in FIG. 2 is typically invoked when the host computer is booted. As part of its initialization process, the method 200 determines the operating system for the computer (block 201) and obtains the full ruleset (203) pertinent to the computer hardware and operating system (block 203). The currently active networked applications are determined (block 205) and the corresponding intrusion rules in the full ruleset are marked (block 207).

The main processing of the method 200 is represented by two threads in FIG. 2. An evaluation thread processes incoming and outgoing network traffic against the marked intrusion rules and handles hostile traffic as described in conjunction with FIG. 1 (block 215). A watch thread intercepts the initialization and termination of network connections for active applications (block 209). When a network connection is initiated for an active application, the method 200 marks the corresponding rules (block 211). When the last network connection for an application is terminated, the method 200 unmarks the corresponding intrusion rules (block 213). In an alternate embodiment, at block 209 the watch thread intercepts the termination of an active application instead of the termination of the network connections for the active application.

In an alternate embodiment not shown, the evaluation thread represented by block 215 is deactivated when the last networked application terminates its networked connection and is reactivated upon when the method 200 detects the initiation of a network connection. It will be appreciated that the method 200 may postpone activating the evaluation thread if no active networked applications are found at block 205. In yet another embodiment not shown, processing represented by block 207, 211 and 213 creates an optimized ruleset as described above in conjunction with FIG. 1.

Figure 3A:
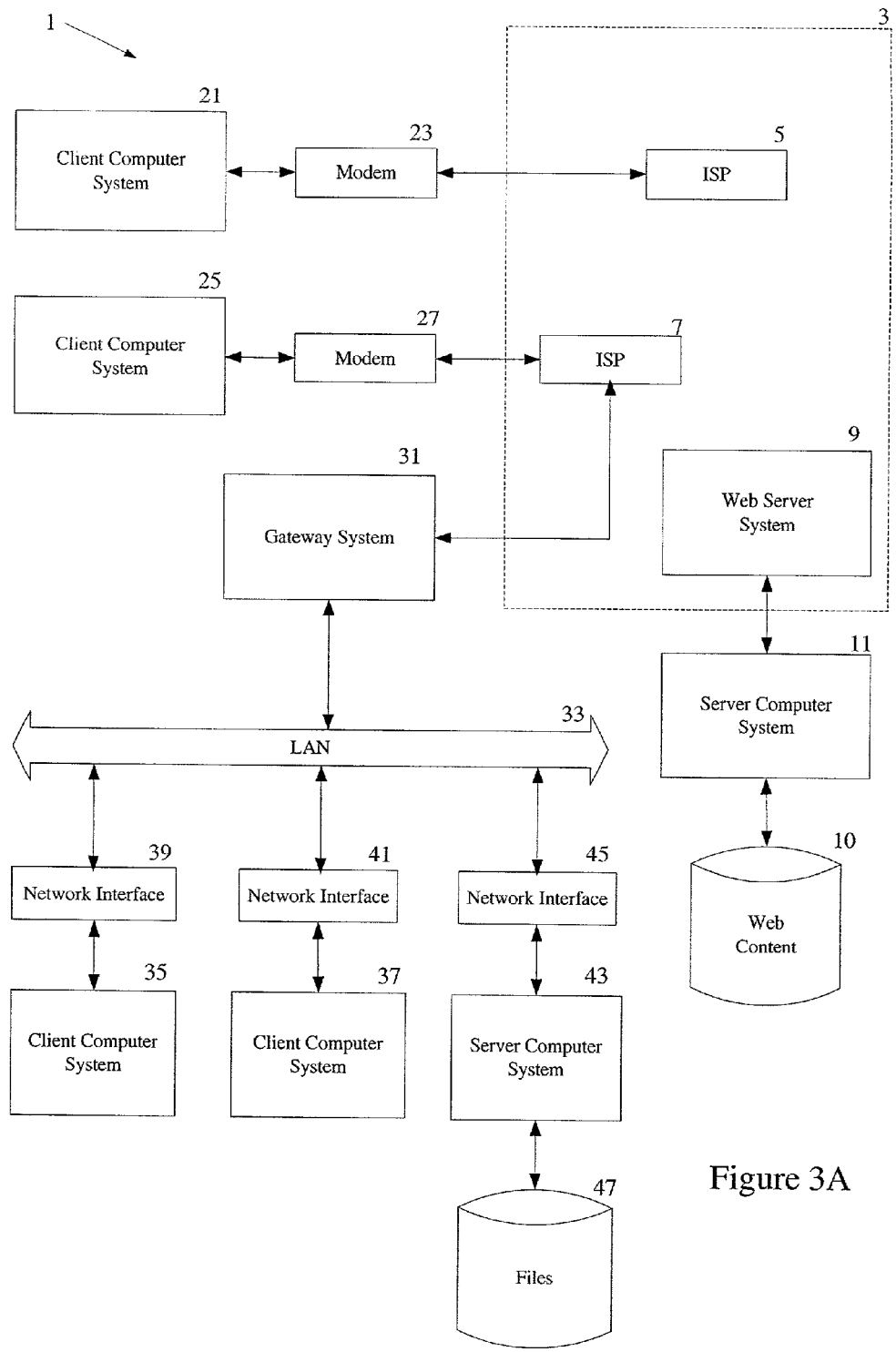
FIG. 3A is a diagram of one embodiment of an operating environment suitable for practicing the present invention.
Figure 3B:
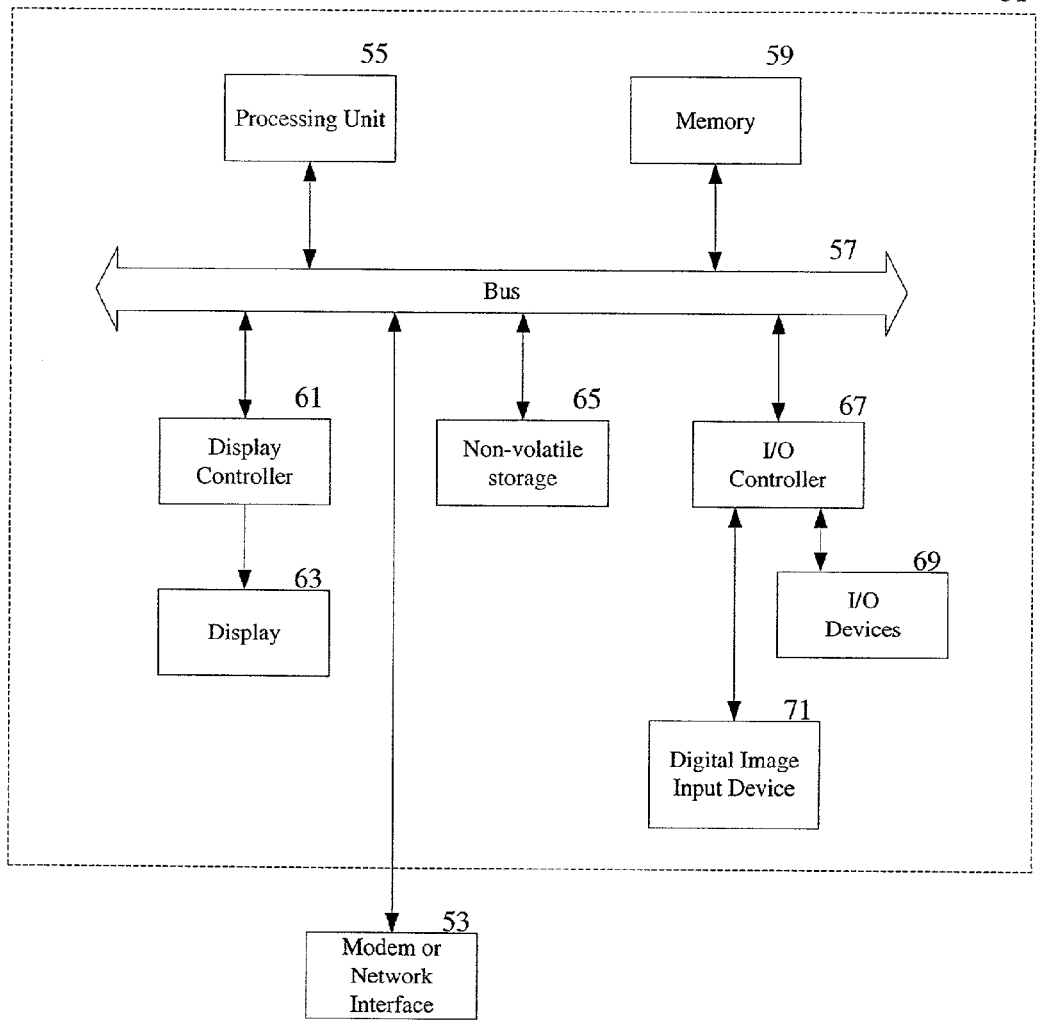
FIG. 3B is a diagram of one embodiment of a computer system suitable for use in the operating environment of FIG. 3A.

The following description of FIGS. 3A-B is intended to provide an overview of computer hardware and other operating components suitable for implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network having a physical or wireless infrastructure, or a combination of both.

FIG. 3A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7, through either physical or wireless interfaces. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld wireless device, including an Internet-capable cellular phone, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface (e.g. "Direct PC"), radio frequency (RF), cellular, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 3B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), radio frequency (RF), cellular, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 3B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

Intrusion prevention based on active networked applications has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill in the art will appreciate that while the invention has been described in terms of intrusion prevention software executing on the processing unit of the computer the software is protecting, the present invention is equally capable of executing as firmware for a hardware card, such as an add-in firewall board, that interfaces with the operating system of the computer. Furthermore, it will be appreciated that the invention is applicable to all types of networks including public and private, wide area and local area, wireless and wired. Therefore, it is manifestly intended that this invention be limited only by the following claims and equivalents thereof.

What is claimed is:

1. A computerized method comprising:
   determining an active networked application;
   filtering a set of intrusion rules to create a subset of intrusion rules corresponding to the active networked application, where the subset of the intrusion rules corresponding to the active networked application are capable of being used for evaluating intrusions that target the corresponding active networked application;
   evaluating network traffic using the subset of intrusion rules;
   detecting when no networked application is active; and
   suspending the evaluating of network traffic until a networked application is active;
   wherein the subset of the intrusion rules corresponding to the active networked application are used for the evaluation for reducing a required amount of processing resources.

2. The computerized method of claim 1 further comprising:
   detecting when the active networked application becomes inactive; and
   re-filtering the set of intrusion rules.

3. The computerized method of claim 2, wherein the detecting when the active networked application becomes inactive comprises:
   monitoring network connection terminations.

4. The computerized method of claim 2, wherein the detecting when the active networked application becomes inactive comprises:
   monitoring application terminations.

5. The computerized method of claim 1, wherein the determining comprises:
   detecting when a network connection for an active application is initiated.

6. The computerized method of claim 1, wherein the filtering comprises:
   marking an intrusion rule corresponding to the active networked application.

7. The computerized method of claim 1, wherein the filtering comprises:
   extracting the subset of rules into an optimized set of rules.

8. The computerized method of claim 1, wherein the evaluating comprises:
   analyzing network traffic on a port specified in the subset of rules.

9. The computerized method of claim 1, wherein the evaluating comprises:
   analyzing network traffic for a protocol specified in the subset of rules.

10. The computerized method of claim 1, wherein the evaluating comprises:
    discarding network traffic that satisfies at least one of the subset of rules; and
    reporting an intrusion attempt.

11. The computerized method of claim 1, wherein the set of intrusion rules comprises signatures of known attacks.

12. The computerized method of claim 1, wherein the set of intrusion rules comprises heuristic rules.

13. The computerized method of claim 1, wherein the intrusion rules include information selected from the group consisting of a targeted active networked application, a specific hostile payload, a network port, and a protocol.

14. The computerized method of claim 1, wherein the intrusion rules include an attack signature.

15. The computerized method of claim 1, wherein at least one of the intrusion rules is a heuristic rule.

16. The computerized method of claim 15, wherein the heuristic rule includes information associated with an active networked application making a new connection never previously made.

17. A computerized method comprising:
    determining an active networked application;
    filtering a set of intrusion rules to create a subset of intrusion rules corresponding to the active networked application, where the subset of the intrusion rules corresponding to the active networked application are capable of being used for evaluating intrusions that target the corresponding active networked application;
    evaluating network traffic using the subset of intrusion rules; and
    continuing the evaluating of network traffic if no networked application is active;
    wherein the subset of the intrusion rules corresponding to the active networked application are used for the evaluation for reducing a required amount of processing resources;
    wherein the subset of rules further corresponds to an operating system.

18. A computer-readable medium having executable instructions to cause a computer to perform a method comprising:
    determining an active networked application;
    filtering a set of intrusion rules to create a subset of intrusion rules corresponding to the active networked application, where the subset of the intrusion rules corresponding to the active networked application are capable of being used for evaluating intrusions that target the corresponding active networked application;
    evaluating network traffic using the subset of intrusion rules;
    detecting when no networked application is active; and
    suspending the evaluating of network traffic until a network application is active;
    wherein the subset of the intrusion rules corresponding to the active networked application are used for the evaluation for reducing a required amount of processing resources.

19. The computer-readable medium of claim 18, wherein the method further comprises:
    detecting when the active networked application becomes inactive; and
    re-filtering the set of intrusion rules.

20. The computer-readable medium of claim 19, wherein the detecting when the active networked application becomes inactive comprises:
    monitoring network connection terminations.

21. The computer-readable medium of claim 19, wherein the detecting when the active networked application becomes inactive comprises:
    monitoring application terminations.

22. The computer-readable medium of claim 18, wherein the determining comprises:
    detecting when an active application initiates a network connection.

23. The computer-readable medium of claim 18, wherein the filtering comprises:
    marking an intrusion rule corresponding to the active networked application.

24. The computer-readable medium of claim 18, wherein the filtering comprises:
    extracting the subset of rules into an optimized set of rules.

25. The computer-readable medium of claim 18, wherein the evaluating comprises:
  analyzing network traffic on a port specified in the subset of rules.

26. The computer-readable medium of claim 18, wherein the evaluating comprises:
  analyzing network traffic for a protocol specified in the subset of rules.

27. The computer-readable medium of claim 18, wherein the evaluating comprises:
  discarding network traffic that satisfies at least one of the subset of rules; and
  reporting an intrusion attempt.

28. The computer-readable medium of claim 18, wherein the set of intrusion rules comprises signatures of known attacks.

29. The computer-readable medium of claim 18, wherein the set of intrusion rules comprises heuristic rules.

30. A computer-readable medium having executable instructions to cause a computer to perform a method comprising:
  determining an active networked application;
  filtering a set of intrusion rules to create a subset of intrusion rules corresponding to the active networked application, where the subset of the intrusion rules corresponding to the active networked application are capable of being used for evaluating intrusions that target the corresponding active networked application;
  evaluating network traffic using the subset of intrusion rules; and
  continuing the evaluating of network traffic if no networked application is active;
  wherein the subset of the intrusion rules corresponding to the active networked application are used for the evaluation for reducing a required amount of processing resources;
  wherein the subset of rules further corresponds to an operating system.

31. A system comprising:
  a processor coupled to a memory through a bus; and
  an intrusion prevention process executed from the memory by the processor to cause the processor to determine an active networked application, to filter a set of intrusion rules to create a subset of intrusion rules corresponding to the active networked application, where the subset of the intrusion rules corresponding to the active networked application are capable of being used for evaluating intrusions that target the corresponding active networked application, and to evaluate network traffic using the subset of intrusion rules;
  wherein the subset of the intrusion rules corresponding to the active networked application are used for the evaluation for reducing a required amount of processing resources;
  wherein the intrusion prevention process further causes the processor to detect when no networked application is active, and to suspend the evaluating of network traffic until a network application is active.

32. The system of claim 31, wherein the intrusion prevention process further causes the processor to detect when the active networked application becomes inactive, and to re-filter the set of intrusion rules.

33. The system of claim 32, wherein the intrusion prevention process further causes the processor to monitor network connection terminations in detecting when the active networked application becomes inactive.

34. The system of claim 32, wherein the intrusion prevention process further causes the processor to monitor application terminations in detecting when the active networked application becomes inactive.

35. The system of claim 31, wherein the intrusion prevention process further causes the processor to detect when an active application initiates a network connection in determining an active networked application.

36. The system of claim 31, wherein the intrusion prevention process further causes the processor to mark an intrusion rule corresponding to the active networked application in filtering the set of intrusion rules.

37. The system of claim 31, wherein the intrusion prevention process further causes the processor to extract the subset of rules into an optimized set of rules in filtering the set of intrusion rules.

38. The system of claim 31, wherein the intrusion prevention process further causes the processor to analyze network traffic on a port specified in the subset of rules in the evaluating of the network traffic.

39. The system of claim 31, wherein the intrusion prevention process further causes the processor to analyze network traffic for a protocol specified in the subset of rules in the evaluating of the network traffic.

40. The system of claim 31, wherein the intrusion prevention process further causes the processor to discard network traffic that satisfies at least one of the subset of rules, and to report an intrusion attempt in the evaluating of the network traffic.

41. The system of claim 31, wherein the set of intrusion rules comprises signatures of known attacks.

42. The system of claim 31, wherein the set of intrusion rules comprises heuristic rules.

43. A system comprising:
  a processor coupled to a memory through a bus; and
  an intrusion prevention process executed from the memory by the processor to cause the processor to determine an active networked application, to filter a set of intrusion rules to create a subset of intrusion rules corresponding to the active networked application, where the subset of the intrusion rules corresponding to the active networked application are capable of being used for evaluating intrusions that target the corresponding active networked application, and to evaluate network traffic using the subset of intrusion rules;
  wherein the subset of the intrusion rules corresponding to the active networked application are used for the evaluation for reducing a required amount of processing resources;
  wherein the intrusion prevention process further causes the processor to further filter the intrusion rules based on an operating system and to continue the evaluating of network traffic if no networked application is active.

44. An apparatus comprising:
  means for determining when an active application becomes an active networked application;
  means for filtering coupled to the means for determining to create a subset of intrusion rules corresponding to the active networked application from a set of intrusion rules, where the subset of the intrusion rules corresponding to the active networked application are capable of being used for evaluating intrusions that target the corresponding active networked application; and
  means for evaluating coupled to the means for filtering to evaluate network traffic using the subset of intrusion rules;

wherein the subset of the intrusion rules corresponding to the active networked application are used for the evaluation for reducing a required amount of processing resources;

wherein the means for determining, further detects when no networked application is active and the means for evaluating further suspends the evaluation of network traffic until the means for determining determines a networked application is active.

45. The apparatus of claim 44, wherein the means for determining further detects when the active networked application becomes inactive and the means for filtering further re-filters the set of intrusion rules when the active networked application becomes inactive.

46. The apparatus of claim 44, wherein the means for evaluating comprises:
   means for discarding network traffic that satisfies at least one of the subset of rules; and
   means for reporting an intrusion attempt.

47. An apparatus comprising
   means for determining when an active application becomes an active networked application;
   means for filtering coupled to the means for determining to create a subset of intrusion rules corresponding to the active networked application from a set of intrusion rules, where the subset of the intrusion rules corresponding to the active networked application are capable of being used for evaluating intrusions that target the corresponding active networked application; and
   means for evaluating coupled to the means for filtering to evaluate network traffic using the subset of intrusion rules;

wherein the subset of the intrusion rules corresponding to the active networked application are used for the evaluation for reducing a required amount of processing resources;

wherein the means for filtering further filters the intrusion rules corresponding to an operating system and the means for evaluating continues the evaluation of network traffic when the means for determining determines no networked application is active.

* * * * *